United States Patent [19]

Grannes et al.

[11] Patent Number: 5,121,829

[45] Date of Patent: Jun. 16, 1992

[54] METHOD AND APPARATUS FOR REDUCING CLEANING BLADE WEAR

[75] Inventors: Steven G. Grannes; Charles A. Rhoades, both of St. Paul; Terry L. Hebbie, Bloomington, all of Minn.

[73] Assignee: The United States of America as represented by the Secretary of the Interior, Washington, D.C.

[21] Appl. No.: 637,580

[22] Filed: Jan. 4, 1991

[51] Int. Cl.⁵ ............................................. B65G 45/00
[52] U.S. Cl. .................................... 198/495; 198/497; 198/499
[58] Field of Search ............... 198/495, 497, 499, 494, 198/493; 15/256.5

[56] References Cited

U.S. PATENT DOCUMENTS

| 263,634 | 8/1882 | Webster | 198/495 |
| 4,189,046 | 2/1980 | Ward | 198/499 |
| 4,781,284 | 11/1988 | Birkheuer et al. | 198/497 |

FOREIGN PATENT DOCUMENTS 1071542  2/1984  U.S.S.R. ............................. 198/495

Primary Examiner—Robert P. Olszewski
Assistant Examiner—Cheryl L. Gastineau
Attorney, Agent, or Firm—E. Philip Koltos

[57] ABSTRACT

An improved cleaning blade construction (10) for eliminating erosion troughs (6) in the upper surface (15) of a cleaning blade member (14) by introducing pressurized fluid through a pressure manifold chamber (16) formed in the upper surface (15) of the cleaning blade member (14). The pressurized fluid will prevent carryback material (7) from passing through a wear groove (6) formed in the cleaning blade member.

8 Claims, 1 Drawing Sheet

METHOD AND APPARATUS FOR REDUCING CLEANING BLADE WEAR

TECHNICAL FIELD

The present invention relates to the field of scraper blades for cleaning conveyor belts and the like, and in particular to a method and apparatus for introducing a pressurized fluid into a scraper blade interior, such that a self-healing action takes place at the edges of the scraper blade in contact with the conveyor belt.

BACKGROUND ART

As can be seen by reference to the following U.S. Pat. Nos. 263,634; 1,543,411; 1,793,246; and 3,583,555; the prior art is replete with myriad and diverse conveyor belt cleaning arrangements employing both mechanical and pneumatic cleaning elements.

While all of the aforementioned prior art constructions are more than adequate for the basic purpose and function for which they have been specifically designed, these patented constructions are not particularly well suited for, nor adapted for use in a high abrasive conveyor belt environment. A rigid scraper blade is required to come into compressive engagement with the conveyor belt surface to accomplish the cleaning of the conveyor belt, such as would be found in a mining situation.

A major contributor to the problem of short life expectancy for the blade type conveyor belt cleaners is uneven wear along the blade edge. Uneven wear results in the formation of channels in the blade edge which allows the passage of carryback between the blade and the belt. In an effort to reduce the uneven wear problem, the U.S. Department of Interior, Bureau of Mines, has undertaken a study of the mechanisms responsible for effective belt cleaning. From this study emerged a design for a cleaner blade that would greatly reduce uneven edge wear. The blade design consisted of a standard cleaner blade incorporating air passages which allow for the expulsion of air along that part of the blade edge which is in contact with the conveyor belt surface. Test results indicated that the expulsion of air on the blade edge prevents further development of the scratches into deep grooves. These tests showed that the effective blade cleaning life can be extended up to 100 times using the pneumatic cleaning blade when compared to tests using solid metal cleaning blades.

Conveyors are used throughout the mining and mineral processing industry for transporting high volumes of material over relatively short distances. Conveyors offer several advantages including: continuous material handling; good transport energy efficiency; low manpower requirements; and high material handling capacities. Several problems are inherent to conveyor transport. These include: conveyor adjustment (i.e. belt tracking); system reliability; and system spillage. The Bureau of Mines is examining these problems.

The problem of system spillage was recently examined. This research was designed to determine the mechanisms involved in the operation of blade type belt cleaners. A significant conclusion drawn in this research was that conveyor blades tend to wear unevenly for all types of blade material, and that wear preferentially occurs in regions of the blade not in direct contact with the belt. These blades included mild steel, tool steel, steel with ceramic inserts, and polyurethane. This research demonstrated that the blade wearout phenomena could be slowed by maintaining proper blade-belt pressures, by eliminating belt irregularities, such as metal splices or recessed belt logos, and by increasing blade hardness. With these suggested improvements, blade cleaning life could be approximately doubled, but maximum effective blade life was still generally less than one day under laboratory conditions. From this study, a design was conceived for a cleaner blade that would greatly reduce uneven edge wear.

As a consequence of the foregoing situation, there has existed a longstanding need particularly in the mining industry for a self-healing scraper blade construction which will prolong the useful life of cleaning scraper blades which contact conveyor belt surface, and the provision of such a construction is a stated objective of the present invention.

DISCLOSURE OF THE INVENTION

The blade design of this invention consists of a standard cleaner blade incorporating air passages which allow for the expulsion of air or other fluid along that part of the blade edge which is in contact with the conveyor belt surface. Several pneumatic blade designs were tested and various combinations of slots or holes in the cleaning blade edge were tested.

Several mechanisms were found to contribute to uneven blade wear. These mechanisms were described as "particle wedging" and as "viscous material flow". These mechanisms contributed to a blade-belt contact interface that could be described as being in a state of unstable equilibrium. The blade-belt interface will remain "flat" as long as no external disturbance occurs such as a random particle gouge, or a belt imperfection causes a wear channel to begin. The concept of the pneumatic blade originated as a method of bringing the contact interface into a state of stable equilibrium. The idea being that a fluid emanating from the blade-belt interface would stabilize the contact interface by preventing preferential particle wedging and viscous material flow, the momentum and pressure of the fluid should preferentially restrict abrasive particles from entering possible wear channel growth areas. The fluid can be thought of as stabilizing the scraper blade cleaning process, but not doing the actual cleaning.

If the pressure of the air within the manifold is kept within certain limits relative to the blade to belt contact pressure, air will be expelled along these scratches preventing further entrapment of abrasive particles. The parameters which are critical to the efficient operation of the pneumatic cleaner blade include: the blade to belt contact pressure; air pressure used in the blade; and, the shape and size of the air exit hole in the blade edge.

The blade to belt contact pressure must be kept significantly above a critical pressure to avoid intermittent loss of cleaning efficiency due to fluctuations in air pressure and irregularities in the drum and belt surface. If the contact pressure is near the critical pressure, these fluctuations in pressure and belt and drum surface could be sufficient to allow enough separation of the blade from the belt to result in the loss of significant quantities of air.

The problem with using non-air blades at pressures significantly above the critical contact pressure has been the high friction between the blade and belt resulting in high blade and belt wear rates. With air blades, however, this is not a problem because the escaping air reduces the net contact force and lubricates the interface reducing the friction.

The pressure of the air expelled along the contact edge of the blade must be kept below the blade to belt contact pressure. Air pressures at, or above, the contact pressure would result in the blade being lifted off of the belt. This would result in two problems: the edge of the blade would not be in position to scrape the carryback off of the belt and the gap between the blade and belt would allow the escape of large quantities of air as well as excessive dust generation.

The results of the testing program have shown that the pneumatic blade design can prevent the creation and enlargement of wear channels on the cleaner blade edge which occur on conventional solid blades. While the overall wear rate is slightly higher, the wear occurs evenly along the edge, this even wear results in a considerably longer useful life expectancy for the pneumatic blade design.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
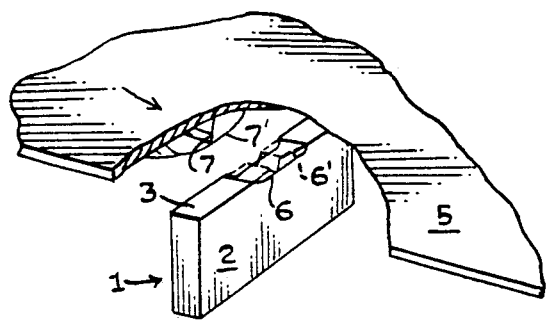
FIG. 1 is a perspective view of the wear channels formed in prior art blades by the carryback phenomena.

As can be seen by reference to the drawings, and in particular to FIG. 1, the cleaning blade construction that forms the basis of the present invention is designated generally by the reference numeral (10). The construction (10) comprises in general, a scraper blade unit (11), a chamber unit (12), and a fluid pressure supply unit (13). These units will presently be described in seriatim fashion.

Prior to embarking upon a detailed description of the subject matter of this invention, it would first be advisable to expand upon the problems that are encountered by the prior art arrangements. As shown in FIG. 1, the conventional conveyor scraper cleaning blade (1) comprises an elongated solid cleaning blade element (2) whose top surface (3) is in pressing contact with the surface (4) of a conveyor belt (5).

As shown in phantom in FIG. 1, once the contacting cleaning blade surface (3) receives a nick, gouge, or groove (6) due to the passage of abrasive material (not shown) between the cleaning blade element (2) and the conveyor belt (5), the groove (6) will allow a small amount of carryback material (7) to repeatedly pass between the conveyor belt (5) and the blade element (2), and each succeeding pass will widen the groove (6) into an erosion trough (6') depicted in solid lines as the mass of accumulated carryback material (7') continues to grow. Obviously, this wear pattern will substantially shorten the useful life of the solid scraper blade elements (2) employed in the prior art arrangement.

Figure 2:
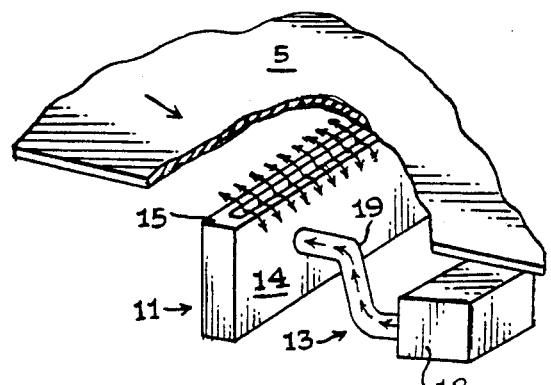
FIG. 2 is a perspective view of the cleaning blade construction that forms the basis of the invention.
Figure 3:
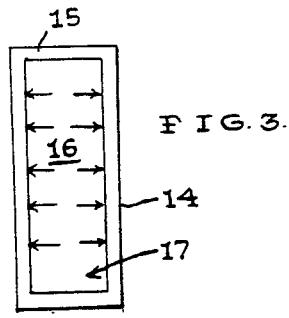
FIG. 3 is a top plan view of the scraper blade prior to wear.

As can be seen by reference to FIGS. 2 and 3, the construction (10) that forms the basis of the present invention includes a scraper blade unit (11) comprising an elongated generally rectangular hollow scraper blade member (14) having a flat upper surface (15).

In addition, the chamber unit (12) comprises an elongated generally rectangular pressure manifold chamber (16) formed by an enlarged central opening (17) extending through the upper surface (15) of the blade member (14).

Furthermore, the interior of the pressure manifold chamber (16) is in open fluid communication with the fluid pressure supply unit (13) which comprises a conventional fluid pump member (18) having a fluid supply conduit (19) extending from the outlet of the pump member (18) to the inlet of the pressure manifold chamber (16).

Figure 5:
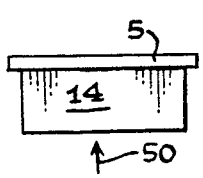
FIG. 5 is a side plan view of the scraper blade prior to wear.

Turning now to FIGS. 3 and 5, it can be seen that the fluid pressure as indicated by the plurality of small arrows is trapped within the pressure manifold chamber (16) where the flat upper surface (15) of the blade member (14) is in contact with the conveyor belt (5).

Figure 4:
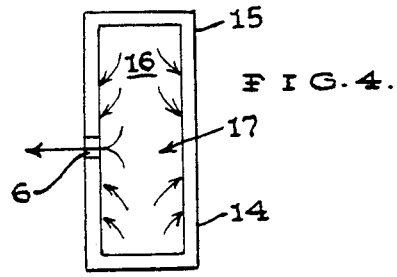
FIG. 4 is a top plan view of the scraper blade at the inception of uneven wear.
Figure 6:
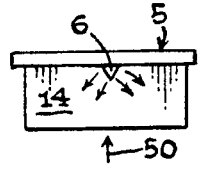
FIG. 6 is a side plan view of the scraper blade at the inception of uneven wear.

Then, as shown in FIGS. 4 and 6, once the flat upper surface (15) of the blade member (14) is nicked or gouged, the pressurized fluid will be forced outwardly through the groove (6) in the blade member (14) to prevent abrasive material from entering the groove (6) to create an erosion trough (6').

It should also be emphasized once again that the fluid pressure that is being delivered to the manifold chamber (16) is sufficient to prevent the entry of abrasive material into the groove (6), but is insufficient to cause the remainder of the top surface (15) of the blade member (14) from breaking contact with the conveyor belt surface (5).

It should further be noted that in order to maintain the frictional contact between the conveyor belt surface (5) and the top surface (15) of the blade member (14), a spring biasing means (50) is applied to the bottom of the blade member (14) to force the blade member (14) against the conveyor belt (5).

Figure 7:
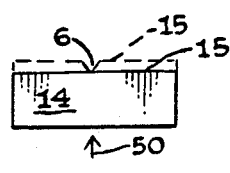
FIG. 7 is a side plan view of the scraper blade illustrating the self-healing aspects produced by the pressurized fluid on the blade contact surface.

Furthermore, as the upper blade surface (15) uniformly wears down as depicted in FIG. 7, the original depth of the gouged groove (6) is subsequently diminished in a self-healing fashion until the groove (6) becomes once more even with the remainder of the newly worn upper surface (15) of the blade member (14).

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

We claim:

1. An improved generally hollow cleaning blade construction for scraper blades in continued contact with a conveyor belt surface, wherein the cleaning blade construction comprises:

a scraper blade unit including an elongated hollow scraper blade member having a normally elongated generally flat rectangular hollow upper peripheral surface which is normally disposed in tight frictional contact with a conveyor belt surface;

an enlarged chamber unit including an elongated relatively deep pressure manifold chamber formed by an enlarged central opening extending through the flat upper peripheral surface of the blade member; and a fluid supply unit in open fluid communication with the interior of said pressure manifold chamber and the interface between the scraper blade and conveyor belt surface wherein the fluid supply unit comprises a fluid pump member in communication with the pressure manifold member via a fluid supply conduit.

2. The construction as in claim 1 wherein said enlarged opening in the pressure manifold chamber has an elongated generally rectangular configuration.

3. The construction as in claim 1 wherein said fluid pump member supplies pressurized fluid to said pressure manifold chamber.

4. The construction as in claim 3 wherein the pressurized fluid in said manifold chamber does not have sufficient force to break the tight frictional engagement between the upper surface of the blade member relative to the conveyor belt surface.

5. A method of reducing the uneven wear of a hollow cleaning blade member having a normally generally flat and hollow upper peripheral surface in continual contact with a moving conveyor belt surface wherein the method involves the steps of:

delivering pressurized fluid to the interface between the hollow upper peripheral surface of the cleaning blade member and the conveyor belt surface; wherein the pressurized fluid is directed against the direction of travel of the conveyor belt member relative to the cleaning blade member.

6. The method as in claim 5 further including the step of:

introducing the pressurized fluid into the hollow interior of the cleaning blade member wherein the hollow interior of the cleaning blade member forms a pressure manifold chamber which extends through the generally flat upper surface of the cleaning blade member.

7. The method of claim 6 wherein the pressurized fluid is insufficient to break the normal tight frictional engagement between the cleaning blade member and the conveyor belt surface.

8. The method of claim 7 wherein the pressurized fluid is sufficient to prevent the passage of foreign material through the interface between the cleaning blade member and the conveyor belt surface.

* * * * *